United States Patent [19]

Smeenge et al.

[11] 4,378,898
[45] Apr. 5, 1983

[54] CARGO CARRIER

[76] Inventors: Paul A. Smeenge, 7955 Shadybrook, SE., Ada, Mich. 49301; George Smeenge, A-3977 Beeline Rd., Holland, Mich. 49423

[21] Appl. No.: 219,597

[22] Filed: Dec. 24, 1980

[51] Int. Cl.³ .............................................. B60M 9/04
[52] U.S. Cl. .................................... 224/328; 224/315
[58] Field of Search ............... 224/328, 329, 319, 315; 414/462; 220/315

[56] References Cited

U.S. PATENT DOCUMENTS

| D. 150,087 | 6/1948 | Martin | D14/27 |
|---|---|---|---|
| 2,597,656 | 5/1952 | Martin | 224/328 X |
| 2,777,727 | 1/1957 | Reilly | 296/21 |
| 2,914,231 | 11/1959 | Hornke | 224/42.1 |
| 3,006,519 | 10/1961 | Doane | 224/42.1 |
| 3,113,690 | 12/1963 | Swenck | 220/315 X |
| 3,145,889 | 8/1964 | Altman, Jr. et al. | 224/328 |
| 3,174,665 | 3/1965 | Williams | 224/42.1 |
| 3,514,023 | 5/1970 | Russell et al. | 224/42.1 |
| 3,712,523 | 1/1973 | Coffman | 224/42.1 |
| 3,907,184 | 9/1975 | Zane et al. | 224/328 X |
| 4,247,026 | 1/1981 | Heifner et al. | 224/328 X |

FOREIGN PATENT DOCUMENTS 77437  3/1960  France .................. 224/328

Primary Examiner—Steven M. Pollard
Attorney, Agent, or Firm—Waters, Lesniak & Willey

[57] ABSTRACT

A cargo carrier system including a tray-shaped base and an inverted tray-shaped removable cover. Means are provided for mounting the base to the roof of a vehicle and for attaching the cover to the base. The cover and the base have continuous flanges extending outwardly in a horizontal direction with continuous resilient sealing means between the flanges for preventing the entry of dust or water into the space between the cover and the base. Resilient sealing means are also provided around the peripheral bottom of the base for a secure and protective mounting and to prevent the entry of air into the space between the bottom of the base and the roof of the vehicle for improved aerodynamics and noise reduction. In a preferred embodiment, the cargo carrier includes means for attaching the inverted cover to a utility trailer thereby allowing the cover to be towed behind a vehicle as a cargo carrier. In addition, either the cover or the base can be used separately on a vehicle roof.

17 Claims, 12 Drawing Figures

4,378,898

CARGO CARRIER

BACKGROUND OF THE INVENTION

1. Field of the Invention

The present invention relates to cargo carriers, and, more particularly, to a cargo carrier system adapted to be mounted on the roof of a vehicle.

2. Description of the Prior Art

Over the years, motorists have frequently found the need for more storage space than has been provided in their vehicles. Consequently, resort has been had to the use of trailers and a variety of car top cargo carriers. While a wide variety of cargo carriers have been in use, they have been plagued with various problems. For example, many are ineffective in preventing water, dust and the like from entering the storage compartment. Others suffer from the use of awkward mounting devices which are difficult to install and which tend to loosen when loads are transported. These devices also do not provide adequate protection for the vehicle roofs, are noisey, and adversely affect vehicle performance. Finally, many of the cargo carriers currently used lack in versatility. Since the vehicle owners' storage needs change from time to time, ranging from suitcases to skiis to large bulky items, a single purpose storage unit is not satisfactory. Accordingly, there is a continuing need for improved cargo carriers which eliminate the water and dust problems, which have simple and secure, protective means for attachment, and which have the flexibility to accommodate a wide range of loads without adversely affecting vehicle performance or creating wind noise.

SUMMARY OF THE INVENTION

According to the present invention there is provided a cargo carrier system which is dust and water free, which has a simple and secure, protective means of attachment to the vehicle roof and which can accommodate a wide variety of loads. The cargo carrier includes a tray-shaped base with a generally horizontal bottom portion and continuous vertical side walls. A continuous flange extends outwardly in a horizontal direction from the lower edge of the side wall. A continuous resilient space sealing means is provided on the bottom of the horizontal flange which prevents entry of air into the space between the bottom of the base and the roof of the vehicle and which protects the roof, distributes the load and improves the aerodynamics of the carrier.

Means are provided for mounting the base to the roof of a vehicle which preferably comprises one or more tie-down straps which pass through horizontal slots on opposing sides of the base side walls with hooks at each end to secure the tie-down straps to each edge of the vehicle roof. Preferably, the hooks have lobes on the ends thereof which can be captivated between the car door top and the door jamb. Also, preferably, the tie-down strap has two free ends which pass through a tightening buckle. The preferred tightening buckle has three parallel slots in the top side and one slot in the bottom side in communication with all three top slots. Both of the free ends of the tie-down strap enter the buckle through the bottom slot and emerge through the middle of the three top slots, at which point the three ends each separately re-enter the buckle through the closest of the two remaining top slots and both re-emerge through the bottom slot.

An inverted tray-shaped removable cover is provided which has a generally horizontal top portion and downwardly extending continuous side walls with a continuous flange extending outwardly in a horizontal direction from the lower edge of the side walls. The inside dimensions of the cover are larger than the outside dimensions of the base so that when the cover is placed over the base, the cover side walls surround the base side walls and the bottom surface of the cover flange rests flatly on the top surface of the base flange. Preferably, a continuous resilient cover sealing means is provided between the cover flange and the base flange to prevent the entry of dust or water into the space between the cover and the base.

Means are provided for attaching the cover to the base which preferably comprise hinged clamping members pivotably mounted on opposing sides of the base flange. Upwardly extending retaining knobs are mounted on the cover flange. The clamping members have downwardly extending portions so that the clamping members pivot over the cover flange to engage the retaining knobs and downwardly displace the cover flange thereby compressing the resilient cover sealing strip and securing the cover to the base.

In a preferred embodiment, the outer dimensions of the top portion of the cover are smaller than the inside dimensions of the base so that the cover may be inverted with the top portion inserted into the base with the cover's open side oriented upwardly so as to allow cargo to be placed in the cover. In this position, means are provided for securing the cover to the base, preferably a removable strap that attaches to the base and extends over the inverted cover.

Another embodiment of the present invention includes mounting the cover in an inverted position on a utility trailer with means for attaching it thereto thereby allowing the cover to be towed behind a vehicle. An additional identical cover may be placed in its normal open side down position on top of the inverted cover and held in place by clamping members similar to those used to clamp the cover to the base so as to completely enclose any cargo placed within the bottom inverted cover.

Finally, either the cover or the base can be used separately. For example, with long loads such as ladders, only the base is used. In the case of stationwagons with existing luggage racks, the cover can be used in conjunction therewith.

DESCRIPTION OF THE PREFERRED EMBODIMENTS

Figure 1:
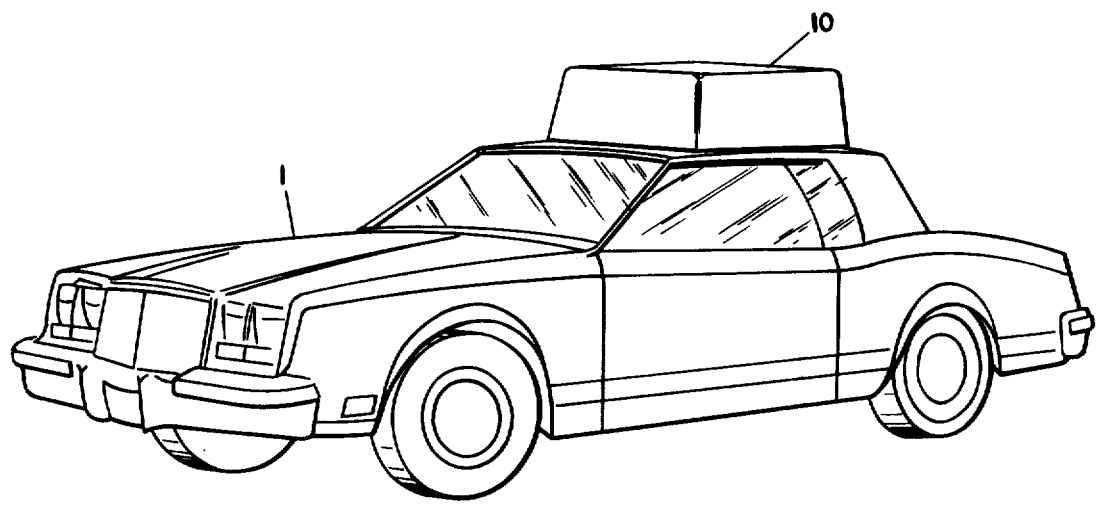
FIG. 1 is a perspective view of a vehicle with the cargo carrier of the present invention mounted on the roof thereof.
Figure 2:
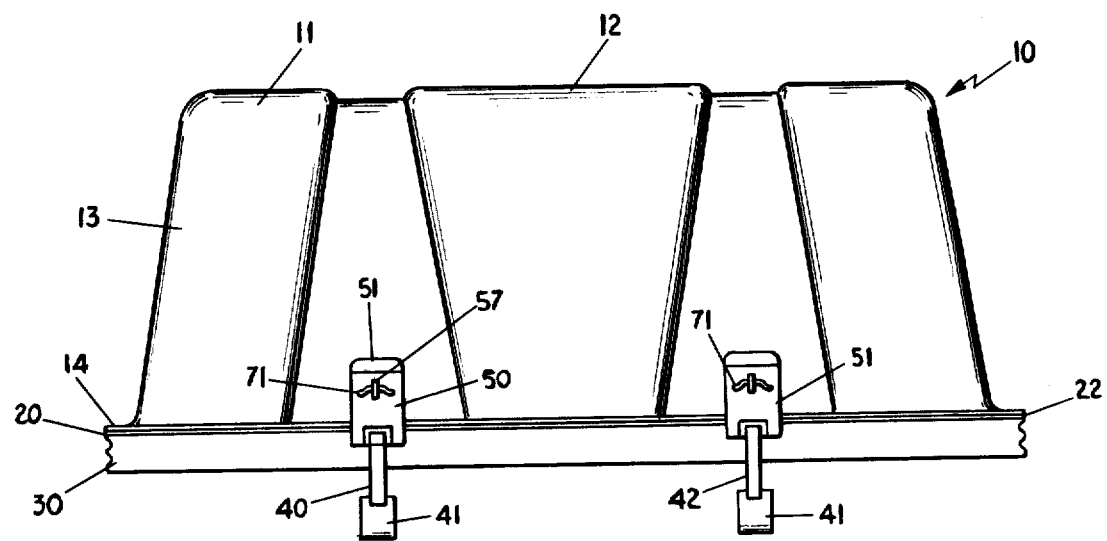
FIG. 2 is a side elevational view of the cargo carrier.
Figure 3:
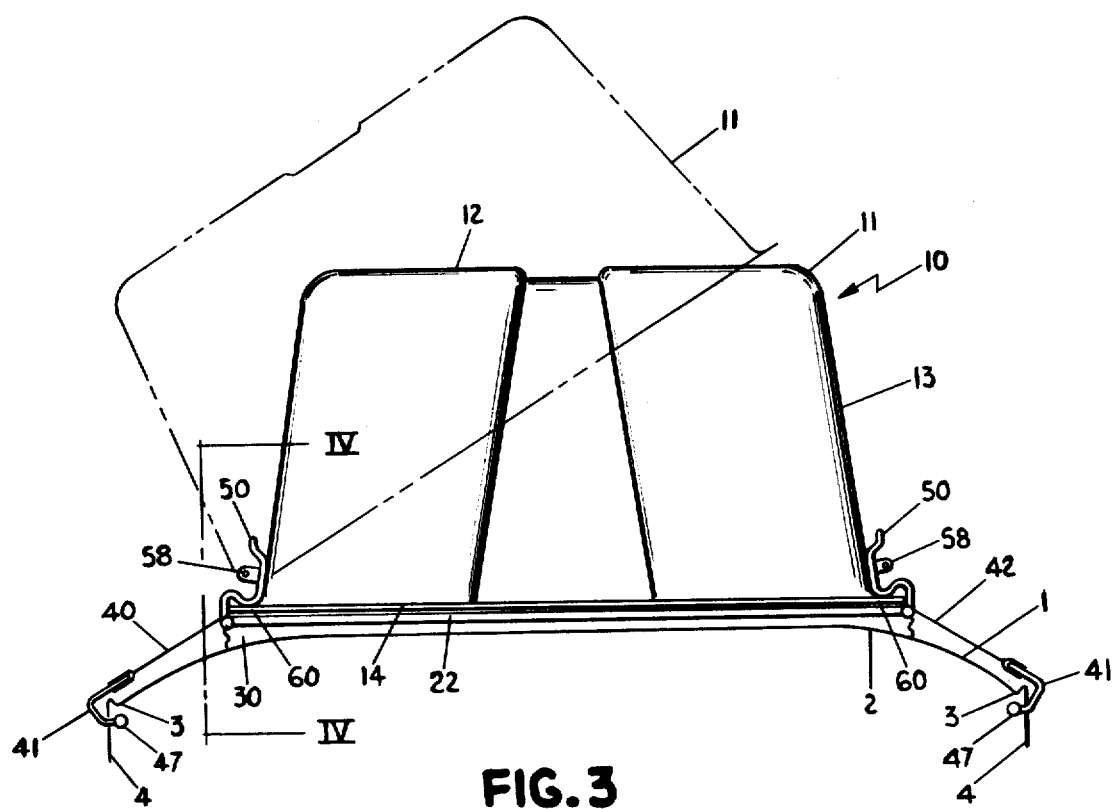
FIG. 3 is a front elevational view of the cargo carrier with the cover in the raised position shown in phantom.
Figure 11:
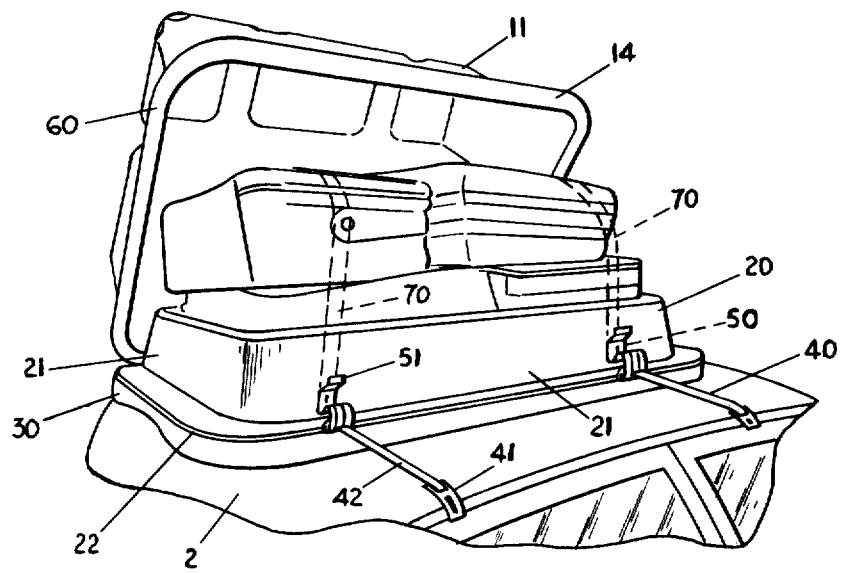
FIG. 11 is a perspective view of the cargo carrier mounted to a vehicle top with the cover in the raised position.

Referring to the drawings in greater detail, FIG. 1 is a perspective view of the cargo carrier 10 of the present invention mounted on the roof of an automobile 1. The components of cargo carrier 10 are best shown in FIGS. 2, 3 and 11 wherein inverted tray-shaped removable cover 11 has a generally horizontal top portion 12 and downwardly extending side walls 13. At the lower edge of side walls 13 is a continuous flange 14 that extends outwardly in a horizontal direction. The inside dimensions of cover 11 are larger than the outside dimensions of carrier base 20 so that when cover 11 is placed over base 20, side walls 13 surround the base side walls 21 and cover flange 14 rests flatly on the top surface of base flange 22.

Base 20 is most clearly shown in FIG. 11. As shown, base 20 is tray-shaped having a generally horizontal bottom portion and continuous vertical side walls 21. A continuous flange 22 extends outwardly in a horizontal direction from the lower edge of side walls 21.

A continuous resilient base sealing means 30 is provided between the bottom of base 20 and the vehicle roof 2 to prevent the entry of air into the space between the bottom of the base and the roof of the vehicle. Preferably, base sealing means 30 is made of a material such as a soft, inert, molded urethane foam and comprises a strip continuously mounted along the bottom surface of base flange 22 of base 20. Base sealing strip 30 can be glued to the bottom of flange 22 or it can be shaped into a one-piece loop and stretched over flange 22 to keep it in place and to provide the required sealing means between cover 11 and base 20. Not only does sealing strip 30 prevent the entry of air under base 20, it also protects the vehicle roof and distributes the weight of the carrier and cargo resulting in less pressure and damage on weak portions of the vehicle roof. Further, since sealing strip 30 closes off the area between base 20 and car roof 2, it reduces wind resistance and noise.

Figure 4:
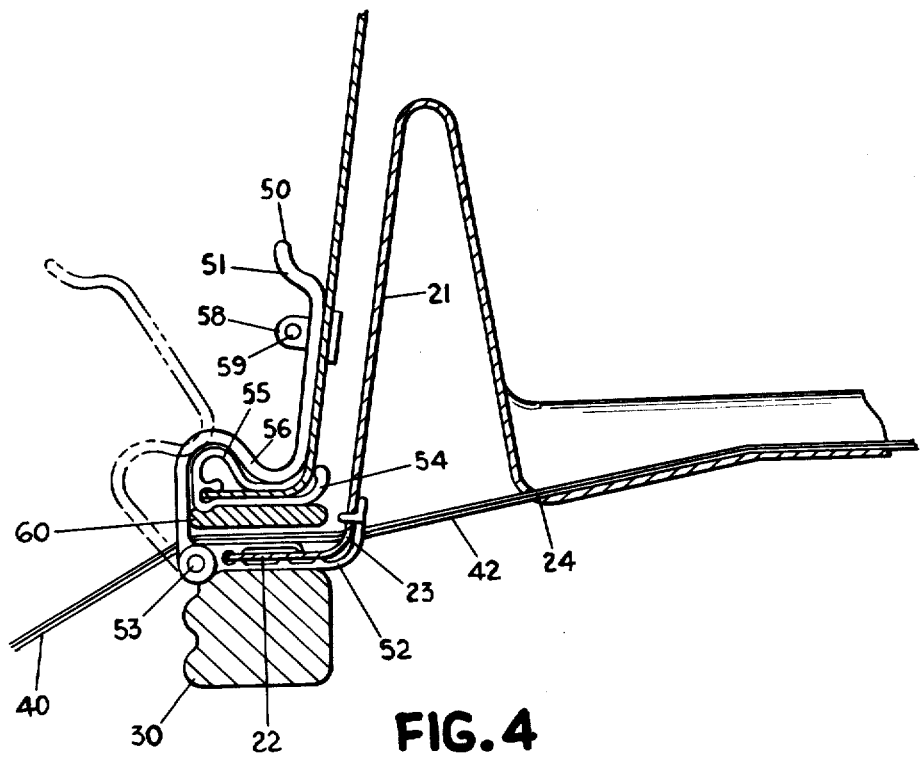
FIG. 4 is a fragmentary cross-sectional elevational view of the hinged clamping members for securing the cover to the base taken along the lines IV—IV of FIG. 3.
Figure 8:
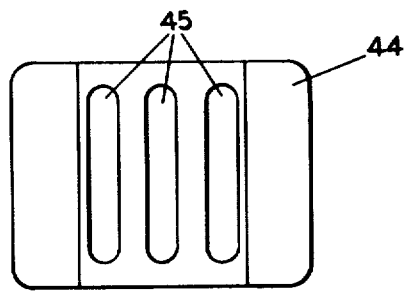
FIG. 8 is a plan view of the preferred tie-down buckle.
Figure 9:
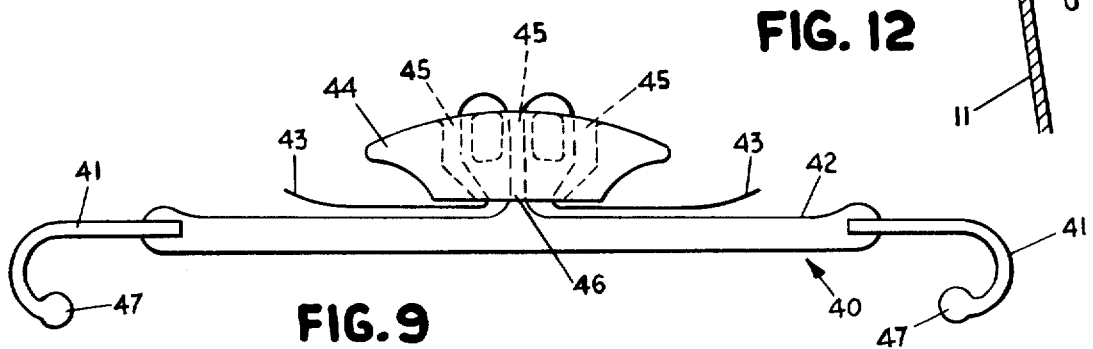
FIG. 9 is a side elevational view of the tie-down strip assembly.

Base 20 is preferably mounted on vehicle roof 2 by means of a tie-down strap assembly 40, as best shown in FIGS. 2, 3, 4 and 9. Tie-down strap assembly 40 comprises gutter hooks 41 and tie-down straps 42. In each tie-down strap assembly, tie-down strap 42 is preferably a continuous piece with two free ends 43. Strap 42 is passed through slots in the shank end of each of gutter hooks 41 and then the free ends of strap 42 are passed through a two-way buckle 44. As best shown in FIGS. 8 and 9, two-way buckle 44 has three slots 45 in the top side and one slot 46 in the bottom side in communication with the three top slots 45. Both of the free ends 43 of strap 42 enter buckle 44 through bottom slot 46 and emerge through the middle of the three top slots 45, at which point free ends 43 each separately re-enter buckle 44 through the closest of the two remaining top slots 45 and both re-emerge through the bottom slot 46. By this arrangement, the tie-down strap assembly 40 can be tightened by pulling on either of free ends 43 of strap 42. In use, as best shown in FIGS. 3 and 4, gutter hooks 41 are hooked over the vehicle roof gutters 3 and preferably, each hook has an enlarged rounded end or lobe 47 so that the hook can be captured between the bottom of gutter 3 or the door jamb and the top of the vehicle door frame 4 thus forming a safety hook for the most secure attachment. Each of the free ends 43 of strap 43 is passed between cover flange 14 and base flange 22 and through opposing pairs of horizontal slots 23 and 24 on opposing sides 21 of base 20. The free ends 43 are then attached to buckle 44 adjacent the inside floor of base 20 in the manner described above. As straps 42 are tightened, the resilient sealing means 30 is compressed as base 20 is urged against vehicle roof 2 to provide a snug attachment with the desired continuous seal. For normal automobile cargo carriers, a pair of tie-down strap assemblies 40 is sufficient to provide the requisite mounting rigidity.

The preferred means for attaching cover 11 to base 20 comprises the use of hinged clamping members 50 which are pivotably mounted on base flange 22 on opposing sides of base 20. As best shown in FIG. 4, hinged clamping member 50 includes an upper pivoting locking portion 41, a pivot axle 53, and a lower attaching clip or extrusion 52 which slips over base flange 22 and into slot 23 to securely mount clamping member 50 to base 20. In a corresponding location on flange 14 of cover 11 are members 54 with upwardly extending retaining knobs 55 securely mounted on flange 14 in the same manner that the clamping members are mounted on base flange 22. Clamping members 50 have downwardly extending portions 56 so that as the clamping members pivot over the cover flange to engage retaining knobs 55, cover flange 14 is downwardly displaced to provide a seal between flange 14 and flange 22. Preferably, a resilient sealing means 60 is disposed continuously between flanges 14 and 22 to provide a dust and watertight seal between the flanges. As discussed above, sealing means 30 can have a top lip portion that fits over flange 22 to function as sealing means 60. As the upper hinged portion 50 is locked in place over retaining knobs 55, cover flange 14 is downwardly displaced thereby compressing the sealing strip 60 to improve the sealing characteristics between cover 11 and base 20.

Because of the unique hinging arrangement of cover 11, only the hinges on one side of the cargo carrier need to be released to have access to the interior of the cargo carrier. With the hinges on one side released, cover 11 is lifted in a clam shell manner with the still secure hinges on the opposite side pivoting and providing the means of preventing the cover from falling away from the vehicle while pivoted upwardly to gain access to the interior of the cargo carrier. For added security, slots 57 can be provided in the upper portion 51 of the clamping members 50 through which pass lugs 58 which protrude outwardly from the side wall of cover 11. A lock or a latch pin 71 can then be placed through holes 59 in lugs 58 to prevent hinge clamp assembly 50 from being opened.

Figure 10:
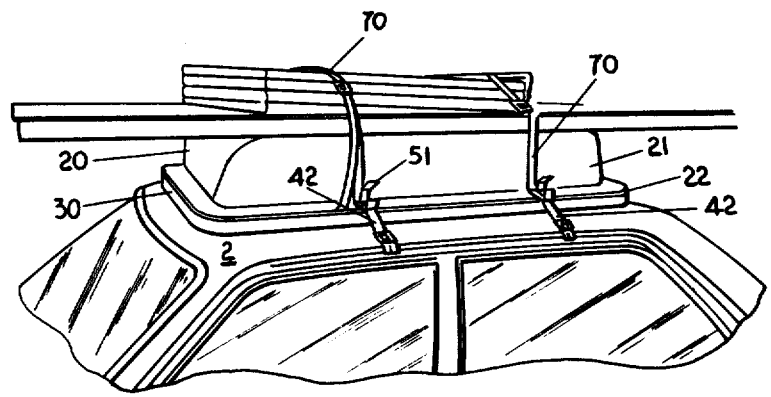
FIG. 10 is a perspective view of the cargo carrier base without the cover in use for storing long objects.

One of the unique features of the cargo carrier of the present invention is that it is flexible in terms of its storage capabilities. For example, in FIG. 11 the cargo carrier is shown for the storage of suitcases with the cover in the clam shell raised position for loading. However, if longer objects such as tables, skiis, poles, ladders, or the like need to be transported, as shown in FIG. 10, cover 11 may be left off of the cargo carrier, and the long objects strapped across the top of base 20 by means of auxiliary straps 70. The free ends of straps 70 are passed from the interior of base 20 through slots 23 and 24 in the side walls thereof and then upwardly and over the top of the load. The free ends of the straps are then secured over the top of the load either by a conventional buckle or by the unique two-way buckle 44 as described above. Auxiliary straps 70 can also be used even when the cover is used to prevent load shifting, as shown in phantom in FIG. 11.

Figure 5:
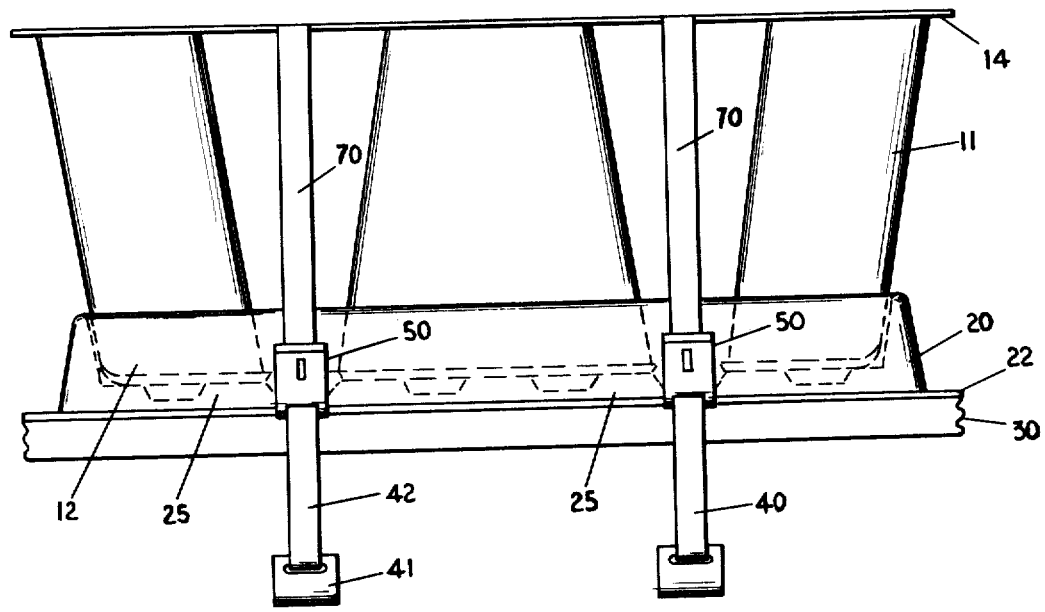
FIG. 5 is a side elevational view of the cargo carrier with the cover in the inverted position.

Still another way to transport cargo with the carrier of the present invention is shown in FIG. 5. As shown, cover 11 is inverted with the open side up. With the normally upper closed portion 12 thereof having a dimension smaller than the inside dimension of base 20, cover 11 can be nested in base 20 as shown. In this position, tie-down strap assemblies 40 are utilized to secure the base to the vehicle and cover 11 is secured to base 20 by auxiliary straps 70 in the manner in which the cargo is secured in FIG. 11.

Figure 6:
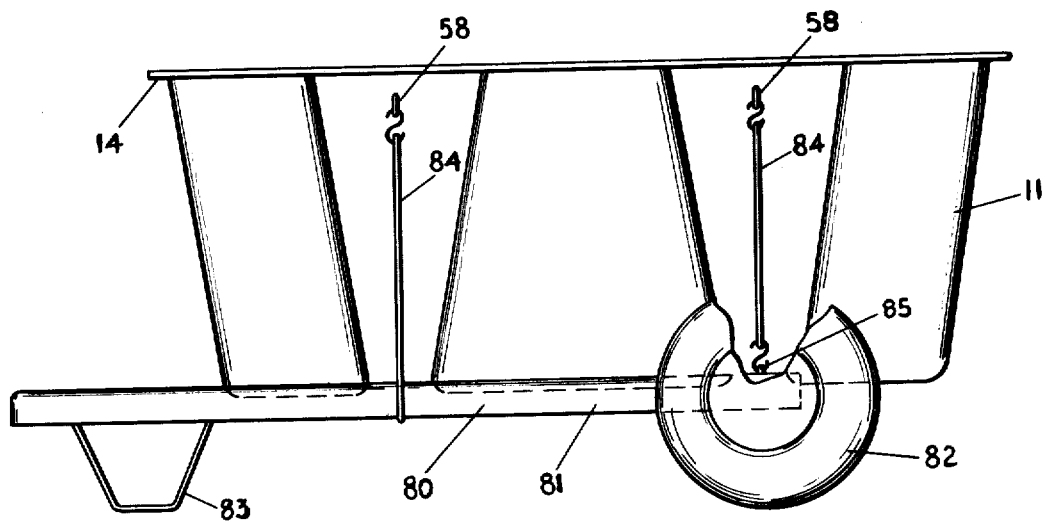
FIG. 6 is a side elevational view of the cargo carrier mounted to a utility trailer.
Figure 7:
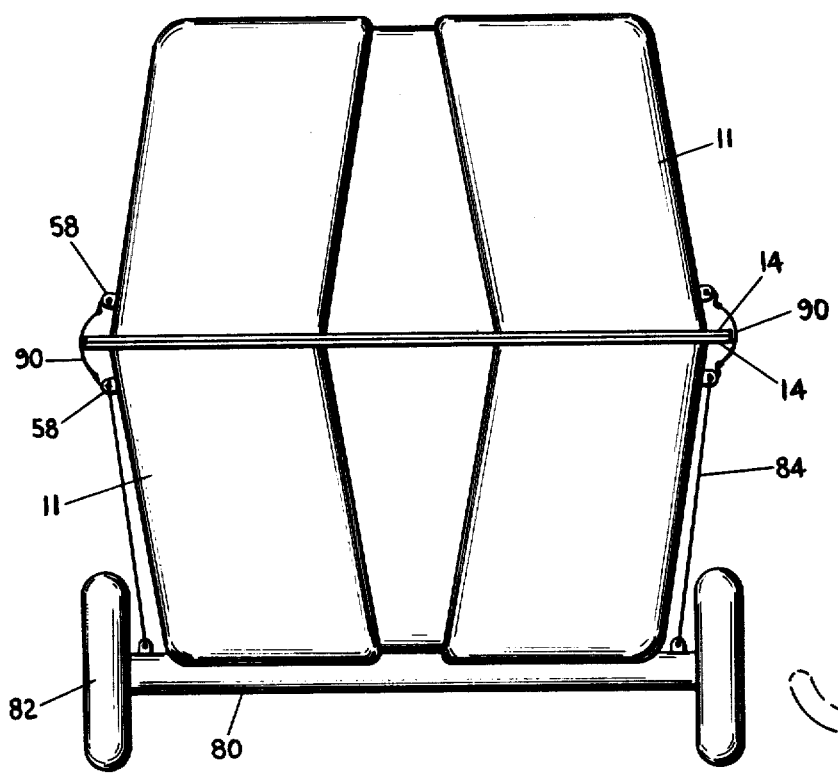
FIG. 7 is a front elevational view of the inverted cargo carrier cover mounted to a utility trailer with a second cover mounted in the normal position on top of the inverted cover.
Figure 12:
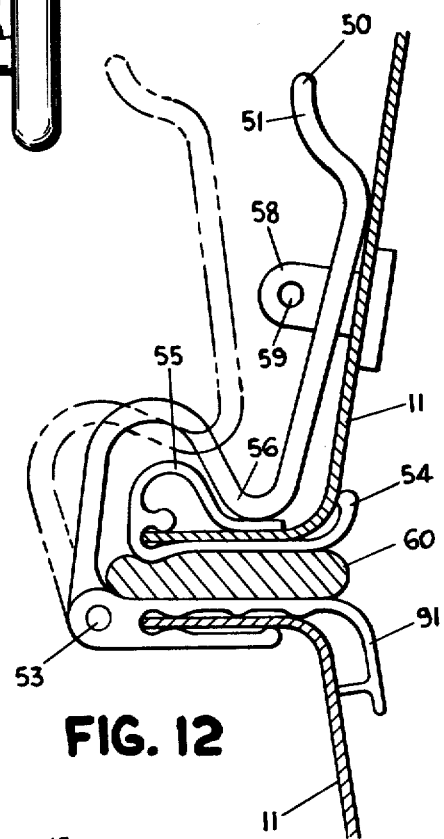
FIG. 12 is a fragmentary side elevational view of a modified hinge clamping asssembly.

Yet another variation of the use of the cargo carrier of the present invention is disclosed in FIGS. 6 and 7. As shown, cover 11 is mounted in the inverted position to a utility trailer or hand cart 80 which comprises a flatbed section 81, conventional wheels 82 and a rest leg 83. Cover 11 is secured to cart 80 by means of tie-down straps or shock cords 84 which are connected between lugs 58 of cover 11 and corresponding lugs 85 on cart 80. Cart 80 can also be hauled behind a vehicle to add additional cargo transporting capabilities. In this case, cart 80 can be inverted so rest leg 83 is on top of bed 81. In order to protect from the weather and the like, a second cover 11, as shown in FIG. 7, may be placed on top of the bottom cover 11 so that cover flanges 14 rest flatly against each other. Conventional straps 90 passing between the corresponding lugs 58 on the covers 11 can be used to tighten the assembly and thereby compress sealing means 60 to provide a watertight compartment. Alternatively, a modified version of hinge clamping assembly 50 can be utilized to secure the two covers together in this application. As shown in FIG. 12, hinge clamping assembly 50 is modified by providing a downwardly turned leg 91 on member 52 so that the hinge clamping assembly can be firmly mounted to flange 14 of the lower cover 11. The upper portion 51 of this modified hinge clamping assembly is then operated in the manner described above to securely attach top cover 11 to bottom cover 11.

Finally, in the case of vehicles with existing luggage racks such as station wagons, the base 20 need not be used. Sealing means 30 is then stretched over and around flange 14 of cover 11 and cover 11 can then be used in conjunction with the existing racks.

Preferably, both the base 20 and cover 11 are one-piece rigid plastic components. In the case of base 20, it is preferred that the inside bottom be provided with a series of ribs 25 for increased strength in supporting the weight of cargo resting therein. In addition, it is preferred that the other parts of the carrier be made of non-corrosive material. For example, as indicated, the cover and base should be made of plastic, preferably a high impact ABS plastic or the like. The tie-down straps are preferably nylon or polyester woven webbing, and the gutter hooks and hinge clamping members are preferably made of PVC, high density polyethylene or like plastics.

The design of the cargo carrier of the present invention with its sloped and curved shape of the cover, as shown in the drawings both front and rear, provides a smooth air flow which reduces drag and turbulence. There are no exposed buckles, loose straps, hollow tubes or forms or the like which can cause noises such as whistling, howling or fluttering. The sealing means between the base and the car roof closes off the area between the carrier and the roof top which reduces wind resistance and noise. In addition, it minimizes wind-lifting forces on the cargo carrier which minimizes stress on the means for attaching the cargo carrier to the vehicle. The overall effect of the aerodynamic improvement of the cargo carrier of the present invention reduces damage from stress, provides better gasoline mileage, better vehicle handling and user satisfaction.

While the preferred embodiments of the present invention have been described and illustrated, it will be obvious to those skilled in the art that various modifications and changes may be made without departing from the spirit of the present invention. Thus, the scope of the present invention is deemed to be limited only by the following claims.

The embodiments of the invention in which an exclusive property or privilege is claimed are defined as follows:

1. A cargo carrier comprising:
   a tray-shaped base cargo container having a generally horizontal bottom portion and continuous generally vertical side walls with a continuous flange extending outwardly in a horizontal direction from the lower edge of the side walls, the exterior of said walls being tapered inwardly;
   means for mounting the base to the roof of a vehicle;
   continuous resilient base sealing means for preventing the entry of air into the space between the bottom of the base and the roof of the vehicle;
   an inverted tray-shaped removable cover having a generally horizontal top portion and downwardly extending continuous side walls with a continuous flange extending outwardly in a horizontal direction from the lower edge of the side walls, the inside dimensions of the cover being larger than the outside dimensions of the base such that when placed over the base, the cover side walls surround the base side walls and the bottom surface of the cover flange rests flatly on the top surface of the base flange; and
   means for attaching the cover to the base to permit said cover to be opened in a clamshell fashion from either side.

2. A cargo carrier according to claim 1, wherein the base side walls have horizontal slots on opposing sides of the base, and wherein the base mounting means comprises a tie-down strap having means for tightening the tie-down strap so that it urges the base against the roof of the vehicle thus compressing the resilient base sealing means, said tie-down strap extending transversely across the top surface of the bottom portion of the base and through the slots in the side walls to engage means for clamping the tie-down strap to each side edge of the vehicle roof.

3. A cargo carrier according to claim 2, wherein said tie-down strap has two free ends and wherein said tightening means comprises a two-way buckle having a top side and a bottom side with three parallel slots in the top side and one slot in the bottom side, the three top slots communicating with the bottom slot and the buckle being attached to the tie-down strap such that both of the free ends enter the buckle through the bottom slot and emerge through the middle of the three top slots, at which point the free ends each separately re-enter the buckle through the closest of the two remaining top slots and both re-emerge through the bottom slot.

4. A cargo carrier according to claim 3, wherein said base sealing means comprises a resilient, base sealing strip continuously mounted along the bottom surface of the base flange such that when the tie-down strap is tightened, the base sealing strip is compressed and remains in continuous contact with the roof of the vehicle.

5. A cargo carrier according to claim 4 which further comprises cover sealing means for preventing the entry of dust or water into the space between the cover and the base comprising a resilient cover sealing flange such that when the cover is attached to the base, the cover sealing strip is compressed and remains in continuous contact with the top surface of the base flange.

6. A cargo carrier according to claim 5, wherein the means for attaching the cover to the base comprises hinged clamping members pivotably mounted on opposing sides of the base flange; and upwardly extending retaining knobs mounted on the cover flange, said clamping members having downwardly extending portions such that the clamping members pivot over the cover flange to engage the retaining knobs and downwardly displace the cover flange thereby compressing the resilient cover sealing strip and securing the cover to the base.

7. A cargo carrier according to claim 6, wherein the means for attaching the cover to the base further comprises means for operating the clamping members independently such that when the clamping member on one side of the cargo carrier is released from engagement with its corresponding retaining knob, the pivotable clamping member on the other side of the cargo carrier may be left in its engaged position, thereby serving as a cover hinge, allowing the cover to be pivotably opened to permit access to the inside of the cargo carrier.

8. A cargo carrier according to claim 7, wherein the outer dimensions of the top portion of the cover are smaller than the inside dimensions of the base so that the cover may be inverted and its top portion inserted into the base with its open side oriented upwardly so as to allow cargo to be placed in the cover.

9. A cargo carrier according to claim 8, further comprising means for securing the cover to the base when the cover is placed on the base in its inverted position.

10. A cargo carrier according to claim 9, wherein the cover securing means comprises a removable strap that attaches to the base and extends over the inverted cover.

11. A cargo carrier according to claim 10, further comprising means for receiving conventional locking mechanisms so as to prevent unauthorized access to the contents of the cargo carrier.

12. A cargo carrier according to claim 11, wherein said base further comprises a ribbed bottom portion for supporting the weight of cargo resting therein.

13. A cargo carrier according to claim 1, further comprising means for attaching the inverted cover to a utility trailer, thereby allowing the cover to be pushed, pulled or towed behind a vehicle.

14. A cargo carrier according to claim 13, wherein the means for attaching the cover to a trailer comprises mounting lugs rigidly attached to the inverted cover and to the trailer and elastic restraining straps having hook members at each end for engaging the mounting lugs.

15. A cargo carrier according to claim 14, further comprising an additional identical cover which may be placed in its normal open-side-down position on top of the inverted cover so that the cover flanges rest flatly against each other and means for mounting the retaining knobs on the flange of the upper cover and for mounting the clamping members on the flange of the lower cover such that the clamping members pivot over and engage the retaining knobs and downwardly displace the top cover flange thereby compressing the resilient cover sealing strips and securing the covers together so as to completely enclose any cargo placed within the bottom inverted cover.

16. A cargo carrier according to claim 3, wherein said means for clamping the tie-down strap to each side edge of the vehicle roof comprises a hook on each of the free ends of said strap, said hooks having lobes on the ends thereof to be captivated between the top of the vehicle door and the door jamb.

17. A cargo carrier comprising:
a tray-shaped base cargo container having a generally horizontal bottom portion and continuous generally vertical side walls with a continuous flange extending outwardly in a horizontal direction from the lower edge of the side walls, the exterior of said walls being tapered inwardly;
means for mounting the base to the roof of a vehicle;
continuous resilient base sealing means for preventing the entry of air into the space between the bottom of the base and the roof of the vehicle;
an inverted tray-shaped removable cover having a generally horizontal top portion and downwardly extending continuous side walls with a continuous flange extending outwardly in a horizontal direction from the lower edge of the side walls, the inside dimensions of the cover being larger than the outside dimensions of the base such that when placed over the base, the cover side walls surround the base side walls and the bottom surface of the cover flange rests flatly on the top surface of the base flange; and means for attaching the cover to the base to permit said cover to be opened in a clamshell fashion from either side wherein the base side walls have horizontal slots on opposing sides of the base, and wherein the base mounting means comprises a tie-down strap so that it urges the base against the roof of the vehicle thus compressing the resilient base sealing means, said tie-down strap extending transversely across the top surface of the bottom portion of the base and through the slots in the side walls to engage means for clamping the tie-down strap to each side edge of the vehicle roof.

* * * * *